United States Patent [19]
Min et al.

[11] Patent Number: 5,768,006
[45] Date of Patent: Jun. 16, 1998

[54] THIN FILM ACTUATED MIRROR ARRAY FOR USE IN AN OPTICAL PROJECTION SYSTEM

[75] Inventors: Yong-Ki Min; Yong-Bae Jeon, both of Seoul, Rep. of Korea

[73] Assignee: Daewoo Electronics Co., Ltd., Seoul, Rep. of Korea

[21] Appl. No.: 704,340

[22] Filed: Aug. 27, 1996

[51] Int. Cl.$^6$ ............................................. G02B 26/00
[52] U.S. Cl. ..................... 359/290; 359/291; 359/310; 359/315; 359/316
[58] Field of Search .......................... 359/290, 291, 359/310, 315, 316

[56] References Cited

FOREIGN PATENT DOCUMENTS

| | | |
|---|---|---|
| 0651274 | 5/1995 | European Pat. Off. . |
| 0712020 | 5/1996 | European Pat. Off. . |
| 0712021 | 5/1996 | European Pat. Off. . |
| 0741310 | 11/1996 | European Pat. Off. . |
| 7301754 | 11/1995 | Japan . |

*Primary Examiner*—Frank G. Font
*Assistant Examiner*—Reginald A. Ratliff
*Attorney, Agent, or Firm*—Anderson Kill & Olick, P.C.

[57] ABSTRACT

An inventive array of thin film actuated mirrors is provided with an active matrix having an array of switching devices, an array of actuating structures and an array of mirrors, wherein each of the actuating structures is cantilevered on the active matrix, and each of the switching devices is positioned on the active matrix beside the position at which each of the actuating structures is cantilevered. In the array, during the operation of the array, since each of the mirrors is connected to the actuating structure through a recessed portion thereof, the mirror stays planar, allowing more accurate and effective reflection of the light beams, which will, in turn, enhance the overall optical efficiency of the array. Furthermore, since the active matrix has the array of switching devices is located beside each of the actuating structures, not directly therebelow, an electrical connection between each of the switching devices and the actuating structure can be made after all of the high temperature processes in the manufacture of the array have been completely, thereby minimizing the effects thereof.

24 Claims, 16 Drawing Sheets

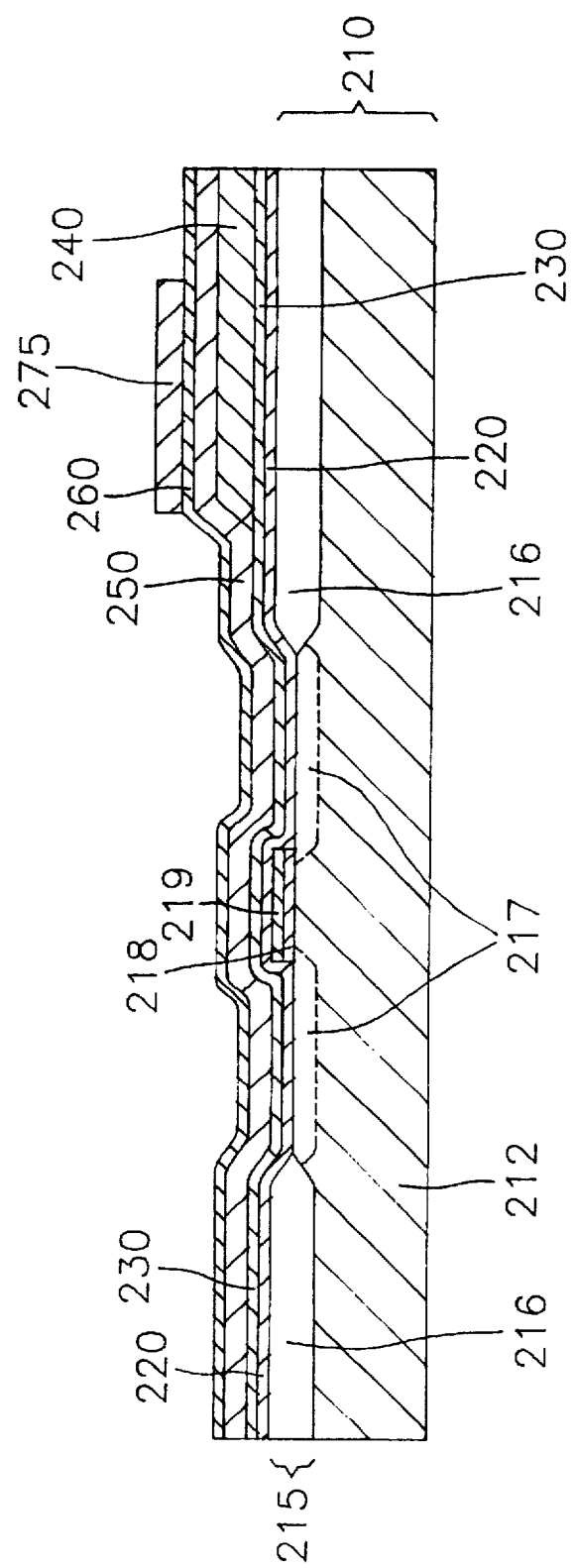

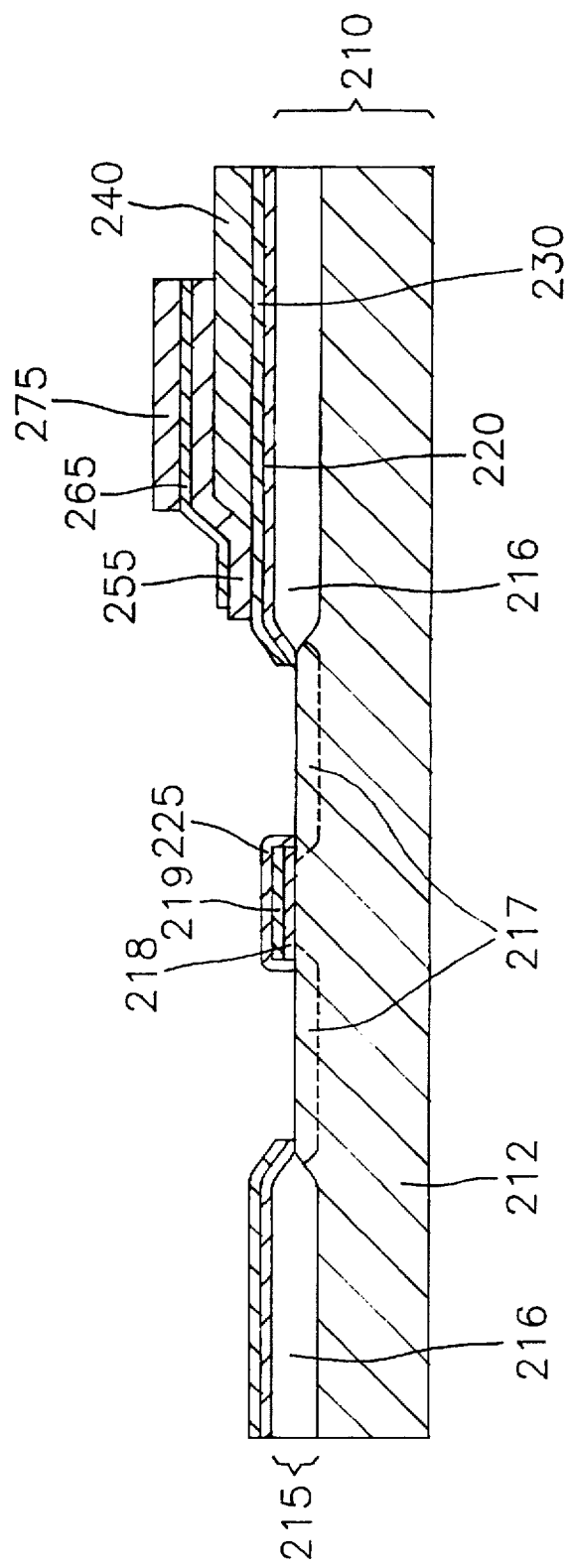

THIN FILM ACTUATED MIRROR ARRAY FOR USE IN AN OPTICAL PROJECTION SYSTEM

FIELD OF THE INVENTION

The present invention relates to an optical projection system; and, more particularly, to an array of M×N thin film actuated mirrors for use in the system and a method for the manufacture thereof, each of the thin film actuated mirrors having an increased optical efficiency and a structure capable of minimizing the effects of a high temperature process involved in the manufacture thereof.

BACKGROUND OF THE INVENTION

Among the various video display systems available in the art, an optical projection system is known to be capable of providing high quality displays in a large scale. In such an optical projection system, light from a lamp is uniformly illuminated onto an array of, e.g., M×N, actuated mirrors, wherein each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of, e.g., an optical baffle. By applying an electric signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1G, there are illustrated manufacturing steps involved in manufacturing an array 100 of M×N thin film actuated mirrors 101, wherein M and N are integers, disclosed in a copending commonly owned application, U.S. Ser. No. 08/430,628, entitled "THIN FILM ACTUATED MIRROR ARRAY".

The process for manufacturing the array 100 begins with the preparation of an active matrix 10 comprising a substrate 12, an array of M×N transistors (not shown) and an array of M×N connecting terminals 14.

In a subsequent step, there is formed on top of the active matrix 10 a thin film sacrificial layer 24 by using a sputtering or an evaporation method if the thin film sacrificial layer 24 is made of a metal, a chemical vapor deposition (CVD) or a spin coating method if the thin film sacrificial layer 24 is made of a phosphor-silicate glass (PSG), or a CVD method if the thin film sacrificial layer 24 is made of a poly-Si.

Thereafter, there is formed a supporting layer 20 including an array of M×N supporting members 22 surrounded by the thin film sacrificial layer 24, wherein the supporting layer 20 is formed by: creating an array of M×N empty slots (not shown) on the thin film sacrificial layer 24 by using a photolithography method, each of the empty slots being located around the connecting terminals 14; and forming a supporting member 22 in each of the empty slots located around the connecting terminals 14 by using a sputtering or a CVD method, as shown in FIG. 1A. The supporting members 22 are made of an insulating material.

In a following step, an elastic layer 30 made of the same insulating material as the supporting members 22 is formed on top of the supporting layer 20 by using a Sol-Gel, a sputtering or a CVD method.

Subsequently, a conduit 26 made of a metal is formed in each of the supporting members 22 by: first creating an array of M×N holes (not shown), each of the holes extending from top of the elastic layer 30 to top of the connecting terminals 14, by using an etching method; and filling therein with the metal to thereby form the conduit 26, as shown in FIG. 1B.

In a next step, a second thin film layer 40 made of an electrically conducting material is formed on top of the elastic layer 30 including the conduits 26 by using a sputtering method. The second thin film layer 40 is electrically connected to the transistors through the conduits 26 formed in the supporting members 22.

Then, a thin film electrodisplacive layer 50 made of a piezoelectric material, e.g., lead zirconium titanate (PZT), is formed on top of the second thin film layer 40 by using a sputtering method, a CVD method or a Sol-Gel method, as shown in FIG. 1C.

In an ensuing step, the thin film electrodisplacive layer 50, the second thin film layer 40 and the elastic layer 30 are patterned into an array of M×N thin film electrodisplacive members 55, an array of M×N second thin film electrodes 45 and an array of M×N elastic members 35 by using a photolithography or a laser trimming method until the thin film sacrificial layer 24 in the supporting layer 20 is exposed, as shown in FIG. 1D. Each of the second thin film electrodes 45 is electrically connected to a corresponding transistor through the conduit 26 formed in each of the supporting members 22 and functions as a signal electrode in the thin film actuated mirrors 101.

Next, each of the thin film electrodisplacive members 55 is heat treated at a high temperature, e.g., for PZT, around 650° C., to allow a phase transition to take place to thereby form an array of M×N heat treated structures (not shown). Since each of the heat treated thin film electrodisplacive members 55 is sufficiently thin, there is no need to pole it in case it is made of a piezoelectric material: for it can be poled with the electric signal applied during the operation of the thin film actuated mirrors 101.

After the above step, an array of M×N first thin film electrodes 65 made of an electrically conducting and light reflecting material is formed on top of the thin film electrodisplacive members 55 in the array of M×N heat treated structures by first forming a layer 60, made of the electrically conducting and light reflecting material, completely covering top of the array of M×N heat treated structures, including the exposed thin film sacrificial layer 24 in the supporting layer 20, using a sputtering method, as shown in FIG. 1E, and then selectively removing the layer 60, using an etching method, resulting in an array 110 of M×N actuated mirror structures 111, wherein each of the actuated mirror structures 111 includes a top surface and four side surfaces, as shown in FIG. 1F. Each of the first thin film electrodes 65 functions as a mirror as well as a bias electrode in the thin film actuated mirrors 101.

The preceeding step is then followed by completely covering the top surface and the four side surfaces in each of the actuated mirror structures 111 with a thin film protection layer (not shown).

The thin film sacrificial layer 24 in the supporting layer 20 is then removed by using an etching method. Finally, the thin film protection layer is removed to thereby form the array 100 of M×N thin film actuated mirrors 101, as shown in FIG. 1G.

There are certain deficiencies associated with the array 100 of M×N thin film actuated mirrors 101 thus manufactured. The first and foremost is the overall optical efficiency. When each of the thin film actuated mirrors 101 deforms in response to an electric field applied across the thin film electrodisplacive member 55 thereof, the first thin film electrode 65 attached thereto, which also acts as a mirror, also deforms to thereby, instead of creating a planar top surface, create a curved top surface from which the light beams are reflected, reducing the effectiveness of the first thin film electrode 65 in reflecting the light beams. As a result, the overall optical efficiency of the array 100 decreases.

Furthermore, since the method involves the high temperature process, the materials used for the connecting terminals 14 in the active matrix 10 and the conduits 26 must be also able to withstand the high temperature, and such materials are usually expensive, which will, in turn, increase the manufacturing cost of the array 100.

SUMMARY OF THE INVENTION

It is, therefore, a primary object of the present invention to provide an array of M×N thin film actuated mirrors for use in an optical projection system having an improved optical efficiency.

It is another object of the present invention to provide an array of M×N thin film actuated mirrors for use in an optical projection system, the array having a novel structure capable of reducing the effect of the high temperature required in the manufacture thereof.

It is still another object of the present invention to provide a method for the manufacture of such an array of M×N thin film actuated mirrors for use in an optical projection system.

In accordance with one aspect of the present invention, there is provided an array of M×N thin film actuated mirrors, wherein M and N are integers, for use in an optical projection system, the array comprising: an active matrix including a substrate and an array of M×N switching devices; an array of M×N actuating structures, each of the actuating structures being cantilevered on the active matrix, each of the actuating structures and the corresponding switching device being located in different regions on top of the substrate, each of the actuating structures being provided with a proximal and a distal ends, each of the actuating structures including a first thin film electrode, a thin film electrodisplacive member and a second thin film electrode, wherein the thin film electrodisplacive member is located between the two electrodes, one of the electrodes is electrically connected to ground, thereby functioning as a common bias electrode in the thin film actuated mirrors, the other electrode is electrically connected to the corresponding switching device, to thereby allow it to function as a signal electrode in each of the thin film actuated mirrors, a bottom portion at the proximal end of each of the actuating structures is attached on top of the active matrix, thereby cantilevering the actuating structure; and an array of M×N mirrors for reflecting incident light beams thereon, each of the mirrors being located on top of each of the actuating structures.

In accordance with another aspect of the present invention, there is provided a method for manufacturing an array of M×N thin film actuated mirrors for use in an optical projection system, the method comprising the steps of: providing an active matrix including a substrate and an array of M×N switching device; depositing a thin film sacrificial layer on top of the active matrix; creating an array of M×N empty cavities on the thin film sacrificial layer, each of the empty cavities encompassing each of the switching devices; depositing a second thin film and a thin film electrodisplacive layers, successively, on top of the thin film sacrificial layer including the empty cavities; patterning the thin film electrodisplacive and the second thin film layers, respectively, into an array of M×N thin film electrodisplacive members and an array of M×N second thin film electrodes, wherein each of the patterned thin film electrodisplacive members and second thin film electrodes does not overlap each of the switching devices; forming an array of M×N first thin film electrodes and an array of contact members, wherein each of the first thin film electrodes is located on top of the thin film electrodisplacive member, and each of the contact members is positioned in such a way that it electrically connects the second thin film electrode with the corresponding switching device; removing the thin film sacrificial layer, thereby forming an array of M×N actuating structures, each of the actuating structures having a proximal and a distal ends and located beside the corresponding switching device; and forming an array of M×N mirrors on top of the array of M×N actuating structures, thereby forming the array of M×N thin film actuated mirrors.

BRIEF DESCRIPTION OF THE DRAWINGS

The above and other objects and features of the present invention will become apparent from the following description of the preferred embodiments given in conjunction with the accompanying drawings, wherein:

FIGS. 3A to 3I reproduce schematic cross section views setting forth a method for the manufacture of the array of M×N thin film actuated mirrors shown in FIG. 2;

DETAILED DESCRIPTION OF THE PREFERRED EMBODIMENTS

Figure 4:
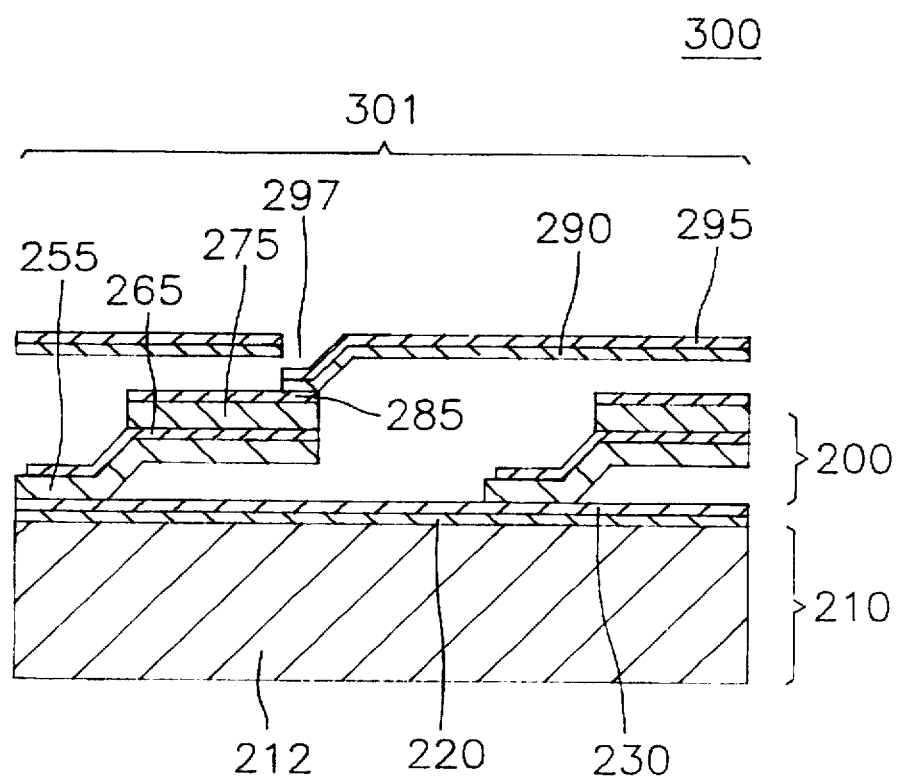
FIG. 4 shows a cross sectional view of an array of M×N thin film actuated mirrors in accordance with the second embodiment of the present invention.
Figure 5:
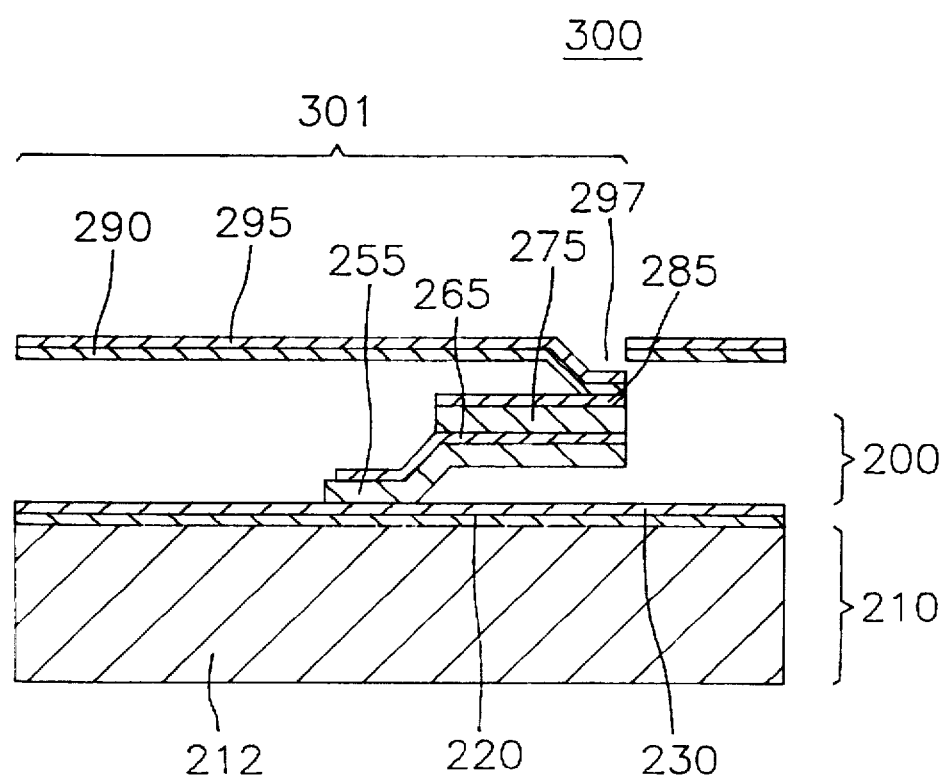
FIG. 5 provides a cross sectional view of an array of M×N thin film actuated mirrors in accordance with the third embodiment of the present invention.

There are provided in FIGS. 2 and 3A to 3I a cross sectional view setting forth an array 300 of M×N thin film actuated mirrors 301, wherein M and N are integers, for use in an optical projection system, and schematic cross sectional views illustrating a method for the manufacture of the array 300 of M×N thin film actuated mirrors 301, in accordance with the present invention, respectively. Furthermore, there are illustrated in FIGS. 4 and 5 cross sectional views of other embodiments of the array 300 shown in FIG. 2. It should be noted that like parts appearing in FIGS. 2, 3A to 3I, 4 and 5 are represented by like reference numerals.

Figure 1A:
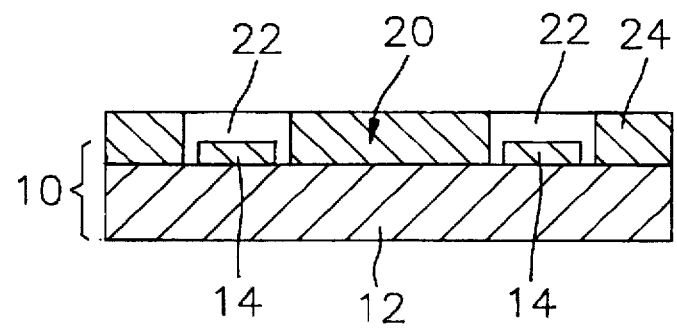
FIGS. 1A to 1G present schematic cross sectional views illustrating a method for the manufacture of an array of M×N thin film actuated mirrors previously disclosed.
Figure 1B:
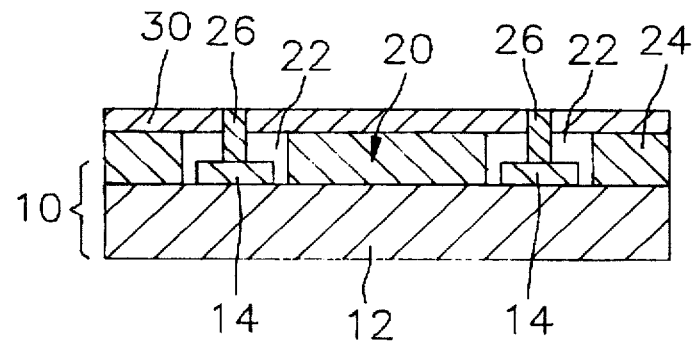
Figure 1C:
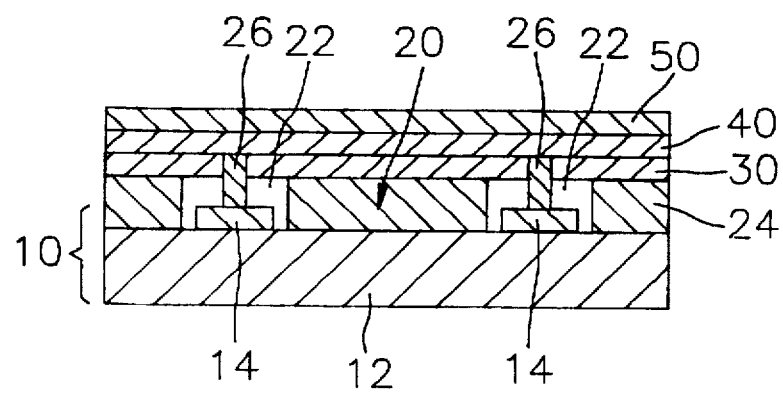
Figure 1D:
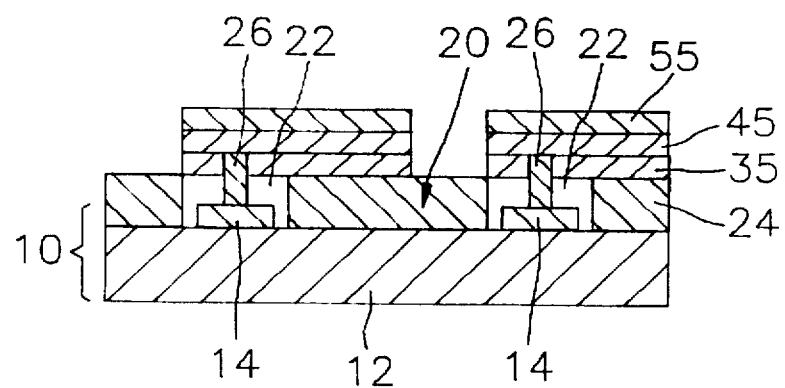
Figure 1E:
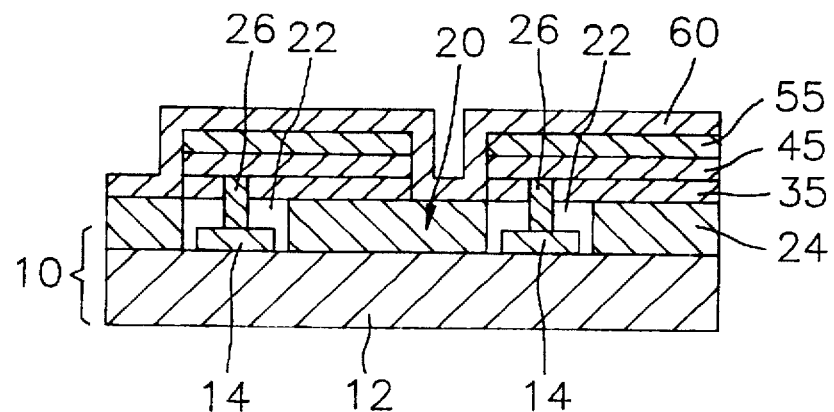
Figure 1F:
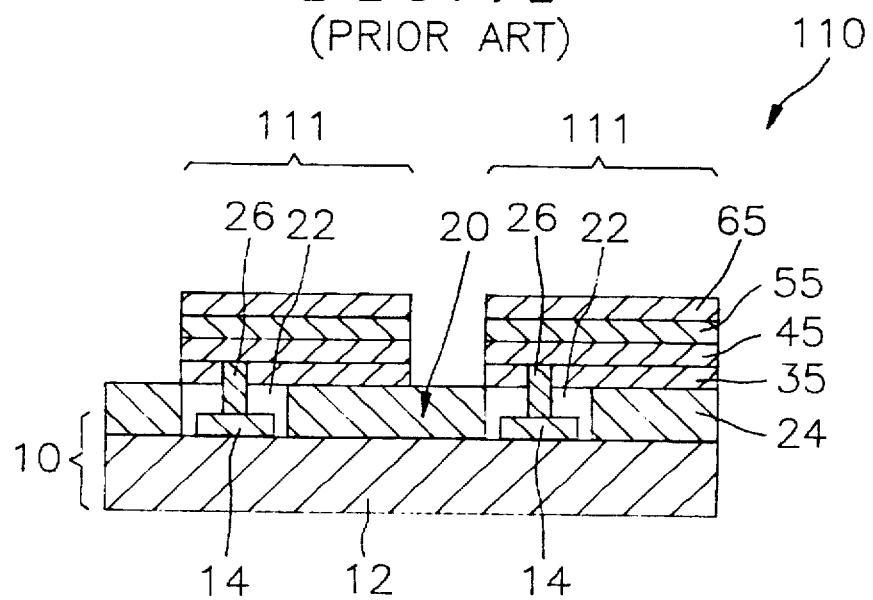
Figure 1G:
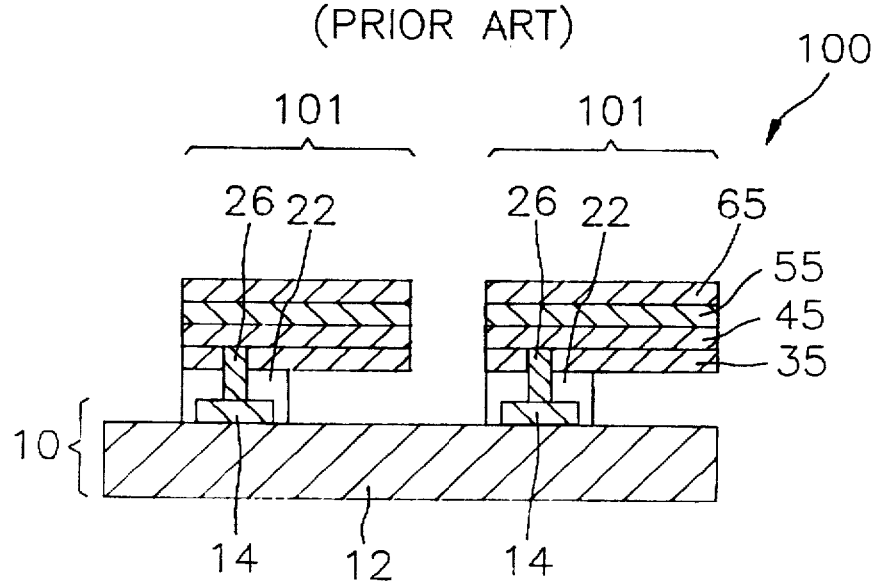
Figure 2:
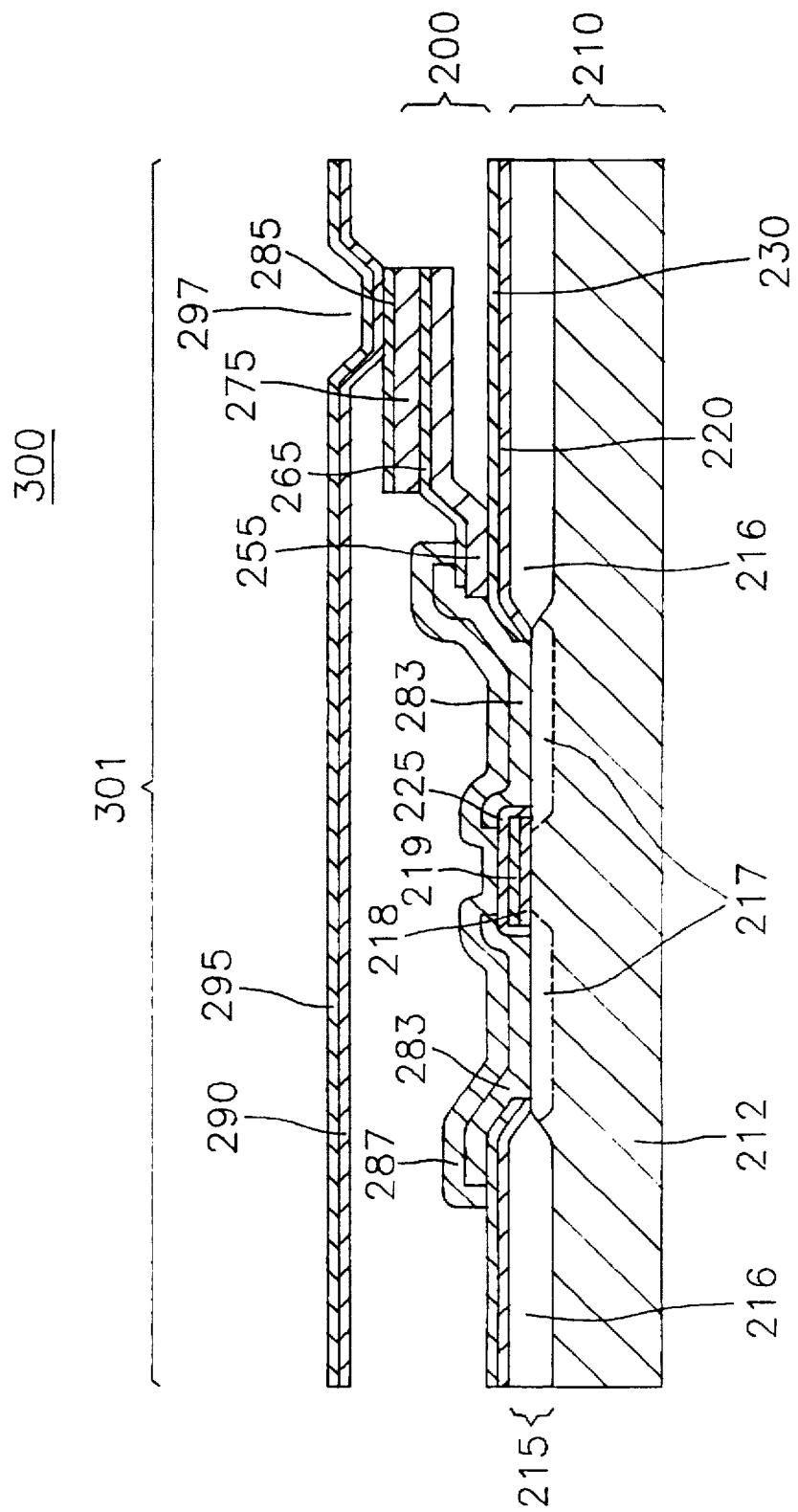
FIG. 2 produces a cross sectional view of an array of M×N thin film actuated mirrors in accordance with the first embodiment of the present invention.

In FIG. 2, there is produced a cross sectional view of an array 300 of M×N thin film actuated mirrors 301 in accordance with the first embodiment of the present invention, the array 300 comprising an active matrix 210, a first passivation layer 220, an etchant stopping layer 230, an array of M×N contact members 283, a second passivation layer 287, an array of M×N actuating structures 200 and an array of M×N mirrors 290.

The active matrix 210 has a substrate 212 with an array of M×N switching devices on top thereof, e.g., metal-oxide-semiconductor (MOS) transistors 215, wherein each of the MOS transistors 215 includes a source/drain region 217, a gate oxide layer 218, a gate electrode 219 and a portion 225 of the first passivation layer 220 covering the gate electrode 219 and the gate oxide layer 218. Each of the actuating structures 200 and the corresponding MOS transistor 215 in the active matrix 210 are located in different regions on top of the substrate 212, respectively, not overlapping each other. The active matrix 210 further includes a field oxide layer 216 formed on top of the substrate 212.

The first passivation layer 220, made of, e.g., phosphor-silicate glass (PSG) or silicon nitride, and having a thickness of 0.1–2 μm, is located on top of the active matrix 210.

The etchant stopping layer 230, made of a nitride, and having a thickness of 0.1–2 μm, is positioned on top of the first passivation layer 220.

Each of the actuating structures 200 is provided with a proximal and a distal ends, and includes a first thin film electrode 285, a thin film electrodisplacive member 275 made of a piezoelectric or an electrostrictive material, a second thin film electrode 265 and an elastic member 255 made of an insulating material. The first thin film electrode 285 is located on top of the thin film electrodisplacive member 275, and is electrically connected to ground, thereby functioning as a common bias electrode in the thin film actuated mirror 301. The thin film electrodisplacive member 275 is positioned on top of the second thin film electrode 265. The second thin film electrode 265 is formed on top of the elastic member 255, and is electrically connected to the source/drain region 217 in the corresponding MOS transistor 215 through one of the contact members 283, thereby allowing it to function as a signal electrode in the thin film actuated mirror 301. The elastic member 255 is located at bottom of the second thin film electrode 265, and a bottom portion at the proximal end thereof is attached on top of the active matrix 210 with the etchant stopping layer 230 and the first passivation layer 220 partially intervening therebetween, thereby cantilevering the actuating structure 200.

The second passivation layer 287 is formed on top of the contact member 283 in such a way that it completely covers the contact members 283.

Each of the mirrors 290, used for reflecting an incident light beam thereon and made of a light reflecting material, is provided with a recessed portion 297 attached on top of the distal end of the actuating structure 200, thereby allowing it to be cantilevered on the actuating structure 200. The location of the recessed portion 297 in each of the mirrors 290, and hence the location at which it attached to the actuating structures 200, maybe varied, resulting in a number of different ways, in which the mirror 290 is placed with respect to the actuating structure 200. For example, the mirror 290 is placed directly above the corresponding actuating structure 200 and the switching device 215, as illustrated in FIG. 4 or it can be placed above a neighboring actuating structure 200 and the switching device 215 thereof, as illustrated in FIG. 5. Each of the mirrors 290 may include a supporting member (not shown) with a thin film layer of light reflecting material deposited on top thereof.

A thin film dielectric member 295 maybe formed, as shown in FIG. 2, on top of the mirror 290 to enhance the structural integrity as well as to enhance the optical efficiency thereof, as disclosed in a copending commonly owned application U.S. Ser. No. 08/581,015, entitled "THIN FILM ACTUATED MIRROR ARRAY HAVING DIELECTRIC LAYERS".

Even though the present invention is described for the case employing the MOS transistors 215, it should be mention that any of the other known switching devices can be employed in place thereof. Furthermore, each of the elastic members 255 can be located on top of each of the first thin film electrodes 285 instead of below each of the second thin film electrodes 265.

In the above array 300 of M×N thin film actuated mirrors 301, the thin film electrodisplacive member 275, and hence the thin film actuated mirror 301, deform in response to an electric field applied across the thin film electrodisplacive member 275 between the first and the second thin film electrodes 285, 265. However, since the mirror 290 is physically connected to the actuating structure 200 only through the recessed portion 297 of the mirror 290, the corresponding mirror 290 stays planar, allowing more accurate and effective reflection of the incident light beam, which will, in turn, enhance the overall optical efficiency of the array 300.

In addition, since each of the actuating structures 200 and its corresponding MOS transistor 215 is located on the substrate 212, not overlapping each other, the contact member 283 and the first thin film electrode 285 in each of the actuating structures 200 may be formed after the formation of the thin film electrodisplacive member 275 in the manufacturing process of each of the thin film actuated mirrors 301, which will, in turn, reduce the effect of the high temperature required in the formation of the thin film electrodisplacive member 275 on the overall physical and electrical integrity of the array 300.

In FIGS. 3A to 3I, there are reproduced schematic cross section views setting forth a method for the manufacture of the array 300 of M×N thin film actuated mirrors 301 shown in FIG. 2.

The process for the manufacture of the array 300 begins with the preparation of an active matrix 210 including a substrate 212 with an array of M×N switching devices, e.g., metal-oxide-semiconductor (MOS) transistors 215 and a field oxide layer 216 formed on top thereof. Each of the MOS transistors 215 has a source/drain region 217, a gate oxide layer 218 and a gate electrode 219.

In a subsequent step, there is deposited a first passivation layer 220, made of, e.g., PSG or silicon nitride, and having a thickness of 0.1–2 μm, on top of the active matrix 210 by using, e.g., a CVD or a spin coating method.

Figure 3A:
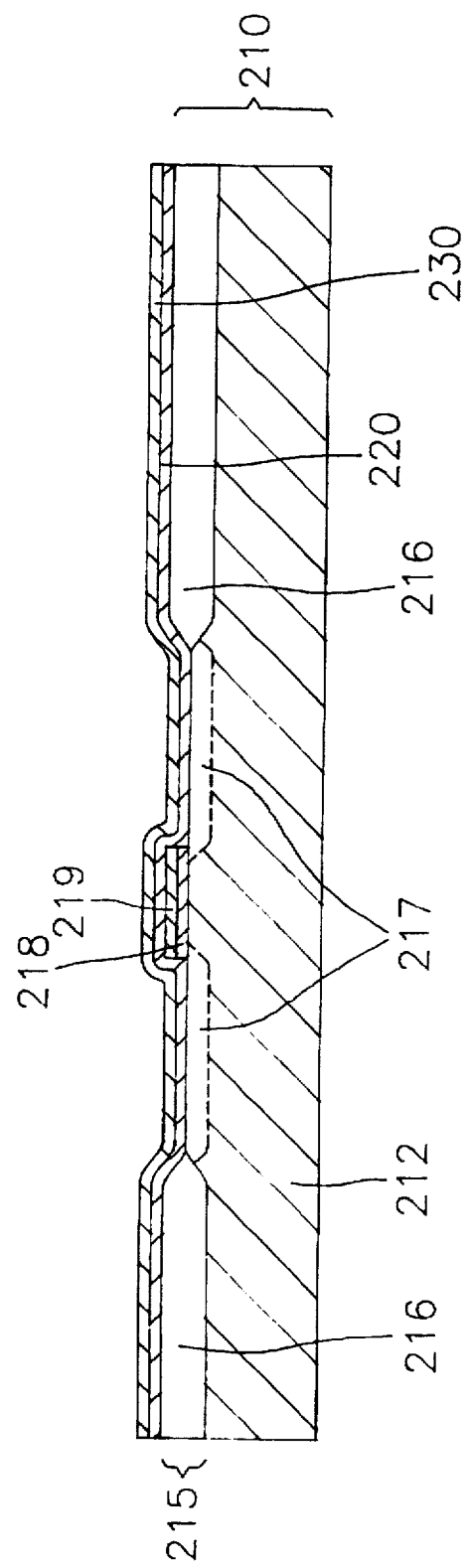

Thereafter, an etchant stopping layer 230, made of a nitride, and having a thickness of 0.1–2 μm, is deposited on top of the first passivation layer 220 by using, e.g., a sputtering or a CVD method, as shown in FIG. 3A.

Then, a thin film sacrificial layer 240 is formed on top of the etchant stopping layer 230. The thin film sacrificial layer 240 is formed by using a sputtering or an evaporation method if the thin film sacrificial layer 240 is made of a metal, a CVD or a spin coating method if the thin film sacrificial layer 240 is made of a PSG, or a CVD method if the thin film sacrificial layer 240 is made of a poly-Si.

Subsequently, an array of M×N empty cavities (not shown) is created on the thin film sacrificial layer 240, in such a way that each of the empty cavities encompasses the source/drain region 217 in each of the MOS transistors 215, by using a dry or an wet etching method.

In a next step, an elastic layer 250, made of an insulating material, e.g., silicon nitride, and having a thickness of 0.1–2

µm, is deposited on top of the thin film sacrificial layer 240 including the empty cavities by using a CVD method.

Figure 3B:
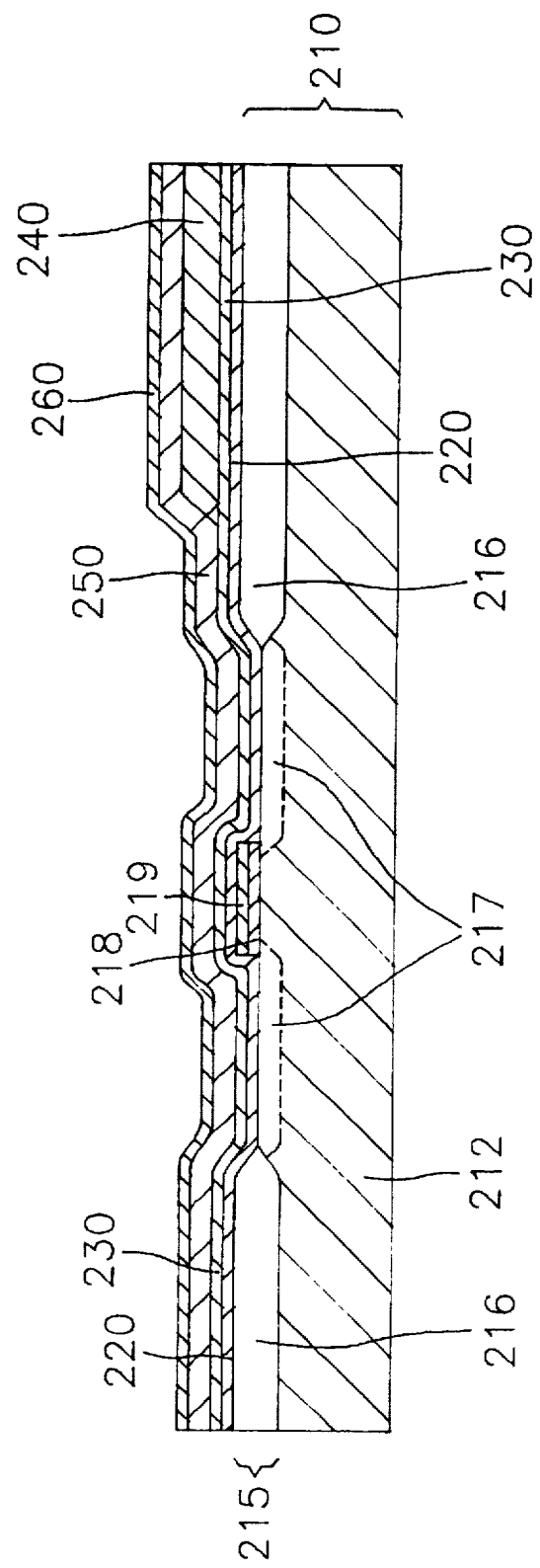

Thereafter, a second thin film layer 260, made of an electrically conducting material, e.g., Pt/Ta, and having a thickness of 0.1–2 µm, is formed on top of the elastic layer 250 by using a sputtering or a vacuum evaporation method. The second thin film layer 260 is then iso-cut in a columnar direction by using an etching method, as shown in FIG. 3B.

Then, a thin film electrodisplacive layer (not shown), made of a piezoelectric material, e.g., PZT, or an electrostrictive material, e.g., PMN, and having a thickness of 0.1–2 µm, is deposited on top of the second thin film layer 260 by using an evaporation, a Sol-Gel, a sputtering or a CVD method. The thin film electrodisplacive layer is then heat treated to allow a phase transition to take place by using a rapid thermal annealing (RTA) method.

Since the thin film electrodisplacive layer is sufficiently thin, there is no need to pole it in case it is made of a piezoelectric material: for it can be poled with the electric signal applied during the operation of the thin film actuated mirrors 301.

Next, the thin film electrodisplacive layer is patterned into an array of M×N thin film electrodisplacive members 275 by using a photolithography or a laser trimming method, as shown in FIG. 3C.

Figure 3D:
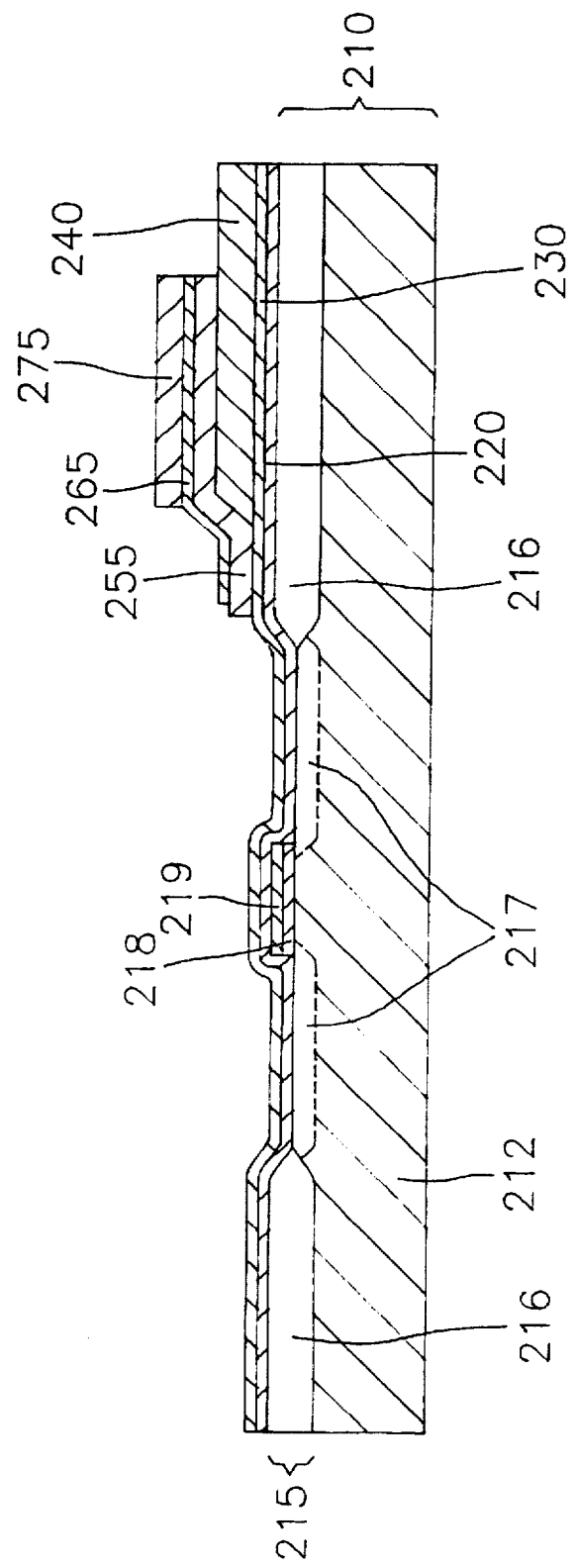

In a subsequent step, the second thin film layer 260 and the elastic layer 250 are, respectively, patterned into an array of M×N second thin film electrodes 265 and an array of M×N elastic members 255 by using an etching method, as shown in FIG. 3D.

In an ensuing step, portions of the etchant stopping layer 230 and the first passivation layer 220 formed on top of the source/drain region 217 in each of the MOS transistors 215, are selectively removed, while leaving intact portions 225 thereof surrounding the gate electrode 219 and the gate oxide layer 218 in each of the MOS transistors 215, by using an etching method, as shown in FIG. 3E.

Figure 3F:
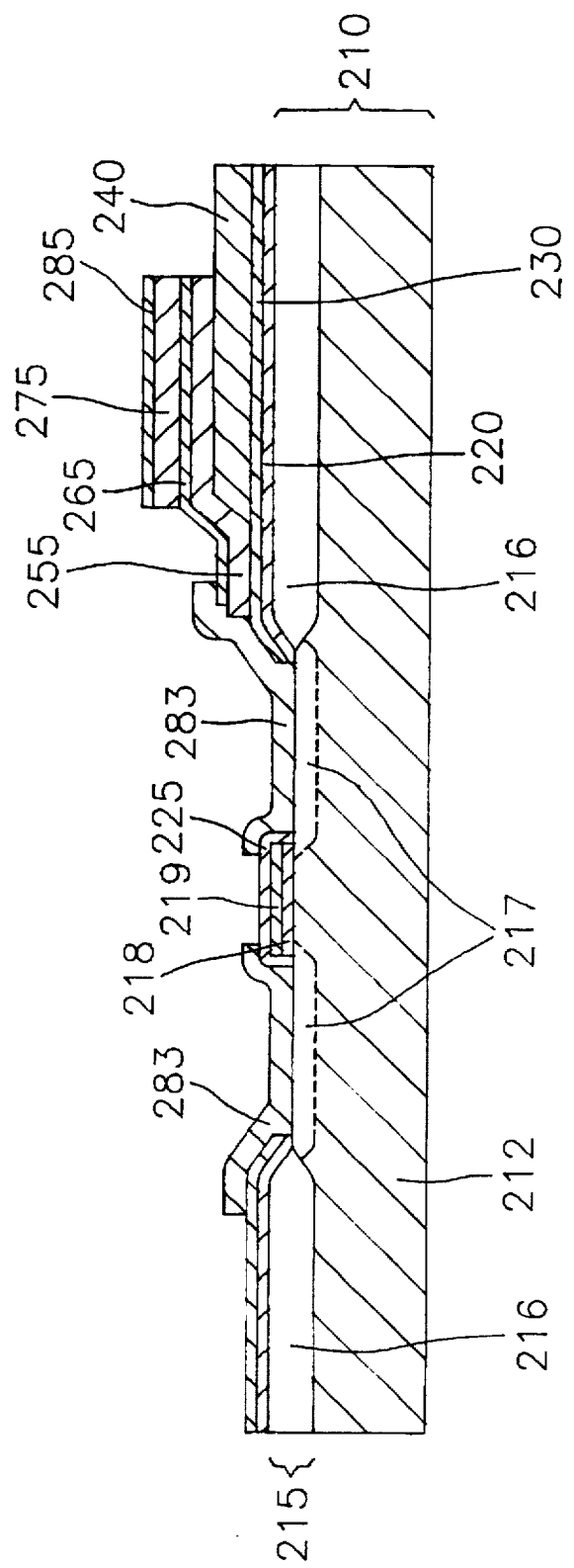

Subsequently, an array of M×N first thin film electrodes 285 and an array of contact members 283 are formed by: first forming a layer (not shown), made of an electrically conducting material, completely covering the above structure, using a sputtering or a vacuum evaporation method; and then selectively removing the layer, using an etching method, as shown in FIG. 3F. Each of the first thin film electrodes 285 is located on top of the thin film electrodisplacive member 275. Each of the contact members 283 is positioned in such a way that it electrically connects the second thin film electrode 265 with the source/drain region 217 in each of the MOS transistors 215.

Figure 3G:
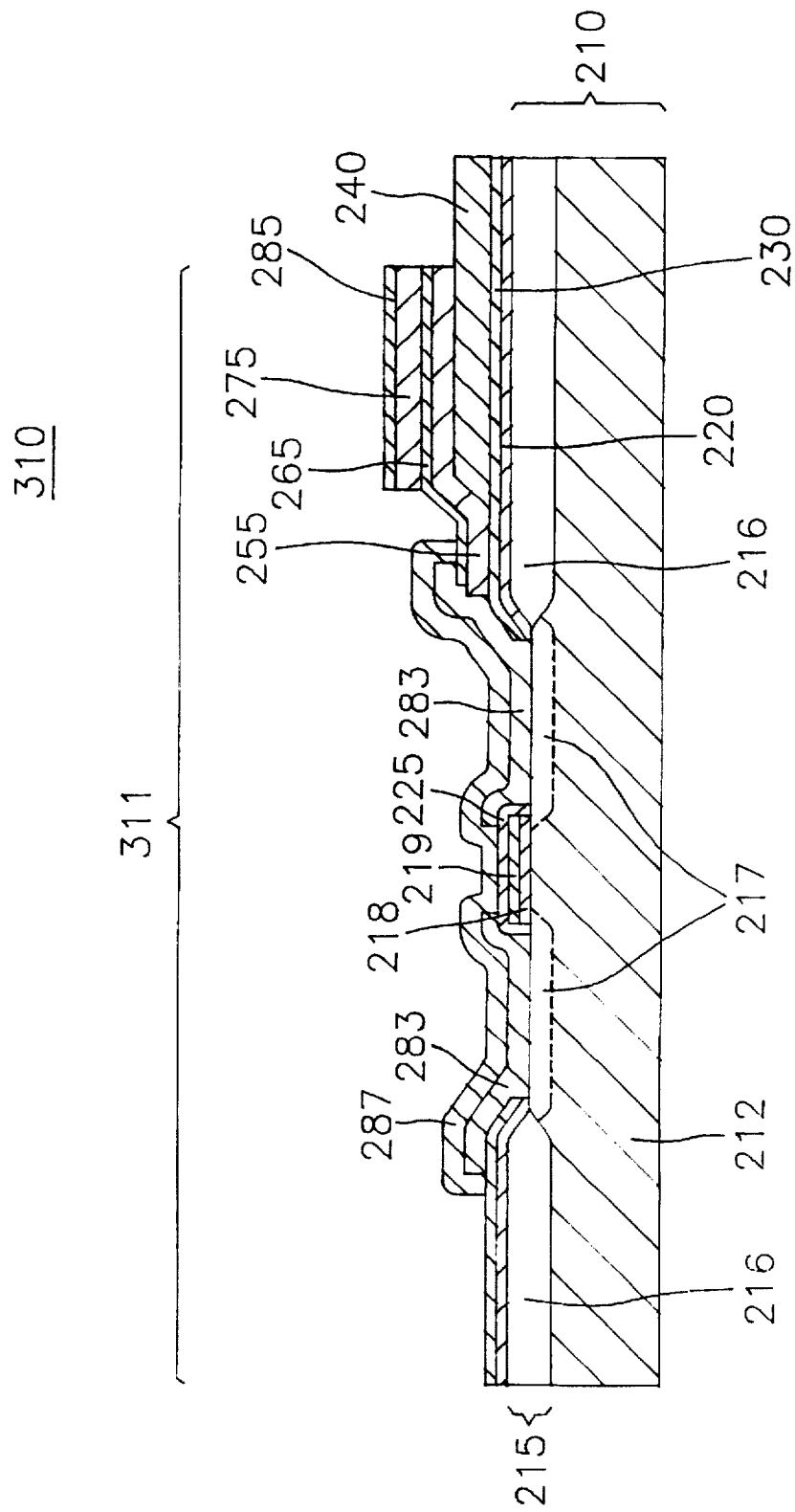

In a following step, a second passivation layer 287, made of, e.g., PSG or silicon nitride, and having a thickness of 0.1–2 µm, is deposited by using, e.g., a CVD or a spin coating method, and then is patterned in such a way that it completely covers the contact members 283, by using an etching method, thereby forming an array 310 of M×N actuated mirror structures 311, as shown in FIG. 3G.

The preceeding step is then followed by completely covering each of the actuated mirror structures 311 with a first thin film protection layer (not shown).

Figure 3H:
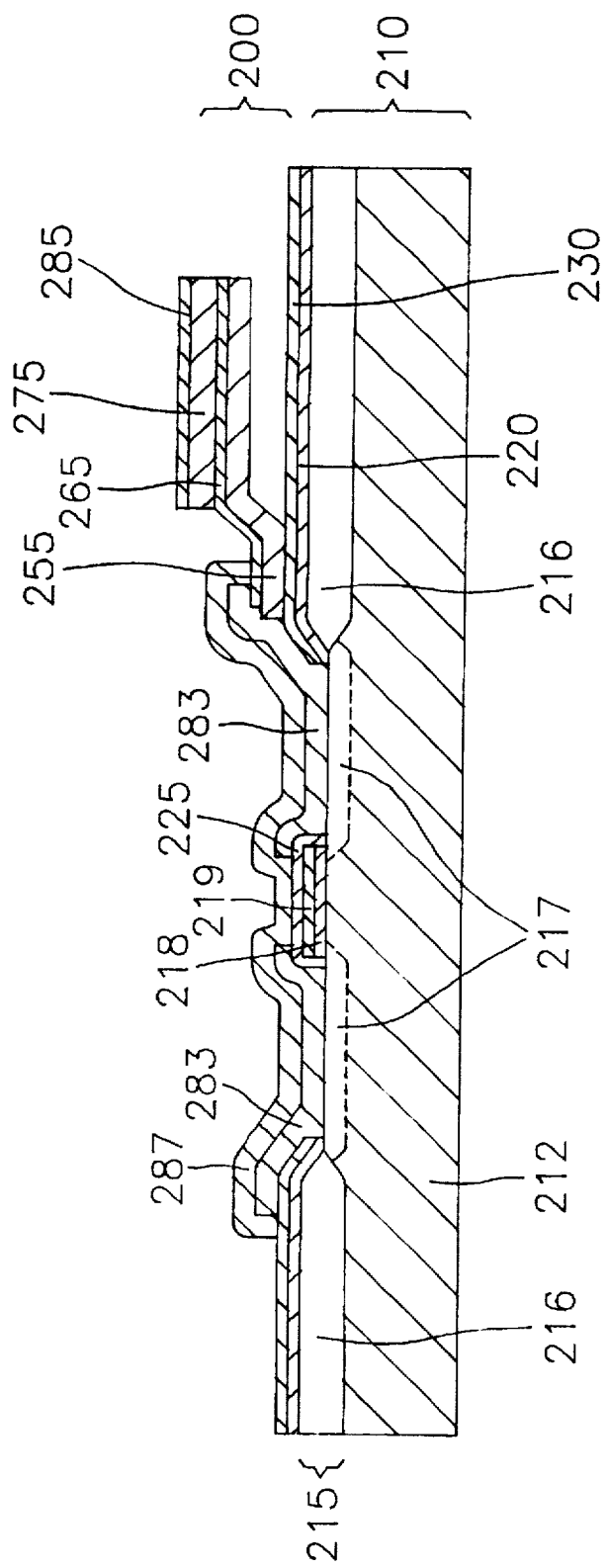

The thin film sacrificial layer 240 is then removed by using an etching method. Thereafter, the first thin film protection layer is removed, thereby forming an array of M×N actuating structures 200, each of the actuating structures 200 having a proximal and a distal ends (not shown), as shown in FIG. 3H.

In a next step, the array of M×N actuating structures 200 is covered with a sacrificial material, including the spaces formed when the thin film sacrificial layer 240 was removed, in such a way that top of the resulting structure (not shown) is completely flat. Thereafter, an array of M×N empty slots (not shown) is created on the resulting structure by using a photolithography method, each of the empty slots extending from top of the resulting structure to top of the distal end of each of the actuating structures 200.

After the above step, a mirror layer (not shown) made of a light reflecting material, e.g., Al, and a thin film dielectric layer (not shown) are, sequentially, deposited on top of the sacrificial material including the empty slots, and then the mirror layer and the thin film dielectric layer are, respectively, patterned into an array of M×N mirrors 290 and an array of M×N thin film dielectric members 295 by using a photolithography or a laser trimming method, thereby forming an array of M×N semifinished actuated mirrors (not shown), wherein each of the mirrors 290 has a recessed portion 297 which is attached on top of the distal end of the actuating structure 200. Each of the mirrors 290 and the thin film dielectric members 295 could be formed in various different shapes, as illustrated in FIGS. 2, 4 and 5.

The preceeding step is then followed by completely covering each of the semifinished actuated mirrors with a second thin film protection layer (not shown).

Figure 3I:
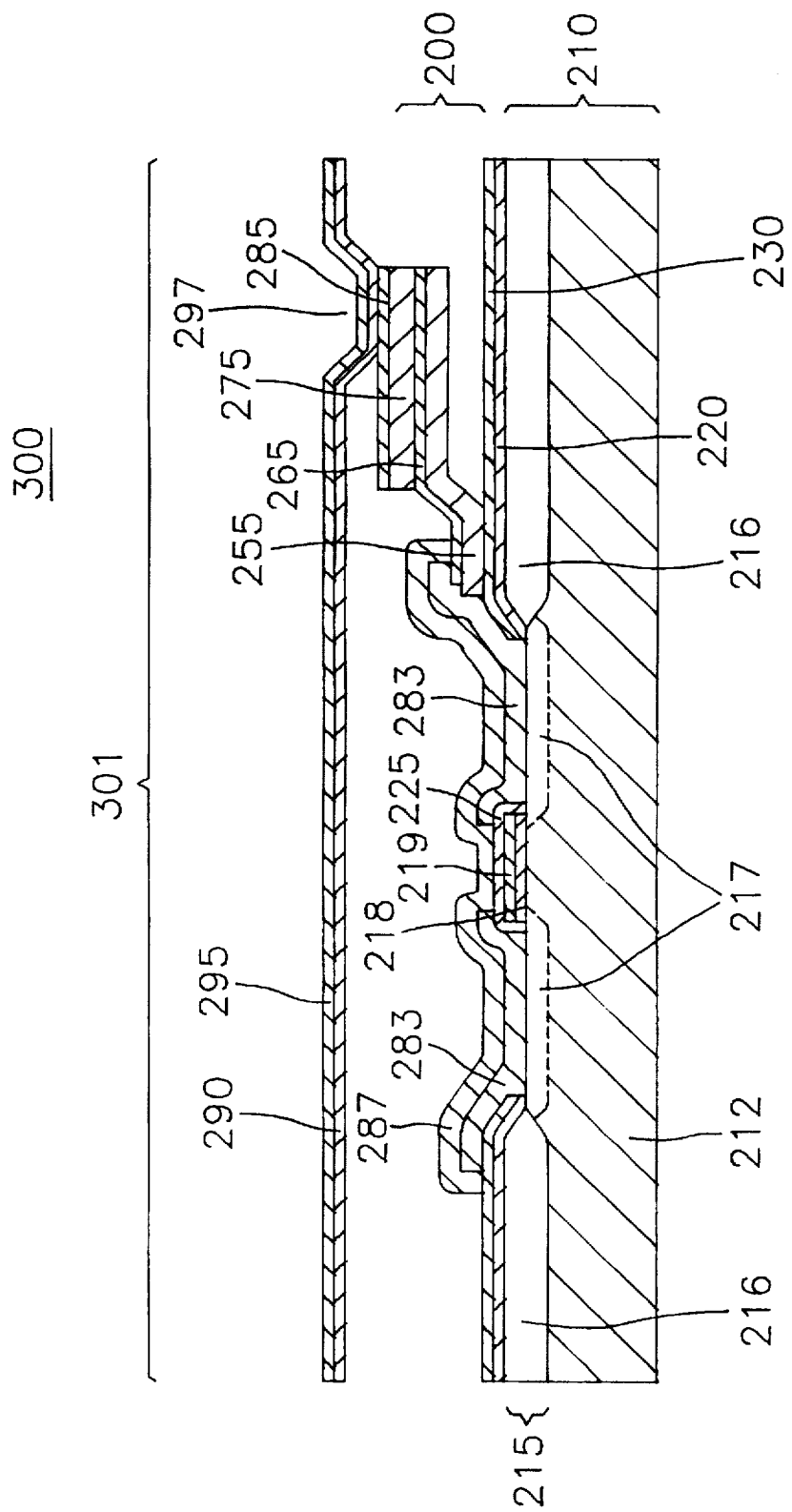

The sacrificial material is then removed by using an etching method. Thereafter, the second thin film protection layer is removed, thereby forming the array 300 of M×N thin film actuated mirrors 301, as shown in FIG. 3I.

It should be mentioned that, even though, the thin film actuated mirrors 301 and the method for manufacturing thereof are described with respect to the case in which each of the actuating structures 200 in the thin film actuated mirrors 301 has a unimorph structure, the ideas presented above can be equally well applied to a case, wherein each of the actuating structures 200 has a bimorph structure, for the latter case just involves an additional electrodisplacive and electrode layers and formation thereof.

Furthermore, the method described above involves the formation of the elastic layer 250 prior to the formation of the second thin film layer 260, each of the elastic members 255 can be formed after the formation of the first thin film electrodes 285 during the manufacturing of the inventive array 300 of thin film actuated mirrors 301.

While the present invention has been described with respect to certain preferred embodiments only, other modifications and variations may be made without departing from the scope of the present invention as set forth in the following claims.

What is claimed is:

1. An array of M×N thin film actuated mirrors, wherein M and N are integers, for use in an optical projection system, the array comprising:

an active matrix including a substrate with an array of M×N switching devices formed on top of the substrate;

an array of M×N actuating structures, each of the actuating structures being provided with a proximal and a distal ends, and including a first thin film electrode, a thin film electrodisplacive member and a second thin film electrode, wherein a bottom portion at the proximal end of each of the actuating structures is attached on the top of the active matrix, and each of the actuating structures and its corresponding switching device are located in different regions on top of the substrate such that they do not overlap with each other; and an array of M×N mirrors for reflecting incident light beams thereon, each of the mirrors being located above each of the actuating structures.

2. The array of claim 1, wherein the thin film electrodisplacive member is located between the first and the second thin film electrodes in each of the actuating structures, one of the electrodes being electrically connected to ground, and the other electrode being electrically connected to the corresponding switching device.

3. The array of claim 1, wherein each of the actuating structures further includes an elastic member.

4. The array of claim 3, wherein the elastic member is located below the second thin film electrode.

5. The array of claim 3, wherein the elastic member is located above the first thin film electrode.

6. The array of claim 1, wherein each of the mirrors has a recessed portion which is physically attached to top of the distal end of an actuating structure.

7. The array of claim 1, wherein each of the switching devices is a metal-oxide-semiconductor (MOS) transistor.

8. The array of claim 1, further comprising an array of M×N thin film dielectric members, each of the thin film dielectric members covers the entire top surface of each of the mirrors.

9. The array of claim 1, wherein each of the mirrors includes a supporting member with a thin film layer of a light reflecting material deposited on top thereof.

10. The array of claim 1, wherein each of the actuating structures has a bimorph structure.

11. The array of claim 1, further comprising a passivation layer formed on top of the active matrix.

12. The array of claim 11, further comprising an etchant stopping layer formed on top of the passivation layer.

13. The array of claim 1, wherein the thin film electrodisplacive member is made of a piezoelectric material.

14. The array of claim 1, wherein the thin film electrodisplacive member is made of an electrostrictive material.

15. The array of claim 1, wherein each of the mirrors is located above a corresponding actuating structure and the switching device thereof.

16. The array of claim 1, wherein each of the mirrors is located above a neighboring actuating structure and the switching device thereof.

17. A method for manufacturing an array of M×N thin film actuated mirrors for use in an optical projection system, the method comprising the steps of:

providing an active matrix including a substrate with an array of M×N switching devices formed on top thereof;

patterning a thin film sacrificial layer deposited on top of the active matrix into an array of M×N empty cavities, each of the empty cavities exposing each of the switching devices on the substrate;

depositing a thin film layer and a thin film electrodisplacive layer, successively, on top of the thin film sacrificial layer including the empty cavities;

patterning the thin film electrodisplacive layer and the second thin film layer, respectively, into an array of M×N thin film electrodisplacive members and an array of M×N first thin film electrodes, wherein each of the patterned thin film electrodisplacive members and the first thin film electrodes does not overlap each of the switching devices;

forming an array of M×N second thin film electrodes and an array of contact members, wherein each of the second thin film electrodes is located on top of the thin film electrodisplacive member, and each of the contact members is positioned in such a way that it electrically connects a first thin film electrode with its corresponding switching device;

removing the thin film sacrificial layer, thereby forming an array of M×N actuating structures, each of the actuating structures having a proximal and distal ends; and forming an array of M×N mirrors on top of the array of M×N actuating structures, thereby forming the array of M×N thin film actuated mirrors.

18. The method of claim 17, further comprising the step of forming an elastic layer after the step of patterning the thin film sacrificial layer into the array of M×N empty cavities.

19. The method of claim 17, wherein each of the mirrors is formed by:

covering the array of M×N actuating structures with a sacrificial material to thereby form a covered structure;

creating an array of M×N empty slots on the covered structure, each of the empty slots extending from top of the covered structure to top of the distal end of each of the actuating structures;

depositing a mirror layer on top of the sacrificial material including the empty slots;

patterning the mirror layer into an array of M×N mirrors; and removing the sacrificial material.

20. The method of claim 17, further comprising the step of forming a passivation layer on top of the active matrix.

21. The method of claim 20, further comprising the step of forming an etchant stopping layer after the step of forming the passivation layer.

22. The method of claim 17, further comprising the step of forming a thin film dielectric member on top of each of the mirrors.

23. The method of claim 17, further comprising the step of forming an additional electrode layer and an additional electrodisplacive layer, successively, after the step of depositing the thin film electrodisplacive layer, such that each of the thin film actuated mirrors has a bimorph structure.

24. An array of M×N thin film actuated mirrors, wherein M and N are integers, for use in an optical projection system, the array comprising:

an active matrix including a substrate with an array of M×N metal-oxide-semiconductor (MOS) transistors formed on top of the substrate;

an array of M×N actuating structures, each of the actuating structures being provided with a proximal and distal ends, and including a first thin film electrode, a thin film electrodisplacive member, a second thin film electrode and an elastic member, wherein the first thin film electrode is located on top of the thin film electrodisplacive member and is electrically connected to ground, the thin film electrodisplacive member is positioned on top of the second thin film electrode, the second thin film electrode is formed on top of the elastic member and is electrically connected to a corresponding transistor, the elastic member is located at bottom of the second thin film electrode and a bottom portion at the proximal end thereof is attached to top of the active matrix, and each of the actuating structures and its corresponding MOS transistor are located in different regions on top of the substrate such that they do no overlap with each other; and an array of M×N mirrors for reflecting incident light beams thereon, each of the mirrors having a recessed portion and being located above each of the actuating structures, wherein only the recessed portion of each mirror is physically attached to top of the distal end of an actuating structure.

* * * * *